United States Patent [19]
Robin et al.

[11] Patent Number: 5,889,267
[45] Date of Patent: Mar. 30, 1999

[54] ELECTRONIC CARD WITH INDICATOR OF NORMAL OPERATION

[75] Inventors: Philippe Robin, Bourg la Reine; Jean-Claude Dubois, Saint Remy les Chevreuse; Hugues Facoetti, Vincennes; Christian Riguidel, St. Martin des Champs; Jean-Pierre Paschal, Suresnes, all of France

[73] Assignee: Thomson-CSF, Paris, France

[21] Appl. No.: 927,963

[22] Filed: Sep. 11, 1997

Related U.S. Application Data

[63] Continuation of Ser. No. 530,718, Sep. 15, 1995, abandoned.

[30] Foreign Application Priority Data

Sep. 16, 1994 [FR] France ................................... 94 11072

[51] Int. Cl.$^6$ ..................................................... G06K 5/00
[52] U.S. Cl. ............................................. 235/380; 235/384
[58] Field of Search ..................................... 235/380, 384, 235/382

[56] References Cited

U.S. PATENT DOCUMENTS

| | | | |
|---|---|---|---|
| 4,614,861 | 9/1986 | Paulou et al. | 235/380 |
| 4,692,601 | 9/1987 | Nakano | 235/380 |
| 4,697,072 | 9/1987 | Kawana | 235/380 |
| 4,701,601 | 10/1987 | Francini et al. | 235/380 X |
| 4,846,922 | 7/1989 | Benge et al. | 156/324 |
| 4,879,455 | 11/1989 | Butterworth et al. | 235/380 |
| 5,113,183 | 5/1992 | Mizuno et al. | 235/382 X |
| 5,180,902 | 1/1993 | Schick et al. | 235/380 |
| 5,416,617 | 5/1995 | Loiseaux et al. | |
| 5,418,365 | 5/1995 | Robin et al. | |
| 5,469,363 | 11/1995 | Saliga | 235/380 |
| 5,485,520 | 1/1996 | Chaum et al. | 235/384 X |
| 5,525,991 | 6/1996 | Nagura et a. | 235/364 X |

FOREIGN PATENT DOCUMENTS

| | | |
|---|---|---|
| 0 560 470 | 9/1993 | European Pat. Off. . |
| 2 680 905 | 3/1993 | France . |
| 2 691 813 | 12/1993 | France . |
| 2 151 987 | 7/1985 | United Kingdom . |

OTHER PUBLICATIONS

Mizuta Masaharu, Mitsubishi Electric Corp, Sep. 30, 1991; Patent Abstracts of Japan, vol. 15, No. 505 (M–1194) Dec. 20, 1991, p. 01/01.

*Primary Examiner*—Anita Pellman Gross
*Assistant Examiner*—Mark Tremblay
*Attorney, Agent, or Firm*—Oblon, Spivak, McClelland, Maier & Neustadt, P.C.

[57] ABSTRACT

An electronic card having an electronic control circuit, an elector-optical element configured as a normal operation indicator, and a power supply source. Electrical tracks connect the electronic control circuit with the electro-optical element and the power supply source, and affixing elements attach the electronic card to a substantially planer surface. The electrical tracks having embrittlement grooves which destroy the connections made by the electrical tracks upon removal of the electronic card from the substantially planer surface to which the electronic card is attached. The electronic card is suited for applications in the identification and automatic detection of objects and in particular, stolen vehicles.

14 Claims, 2 Drawing Sheets

ELECTRONIC CARD WITH INDICATOR OF NORMAL OPERATION

This application is a Continuation of application Ser. No. 08/530,718, filed on Sep. 15, 1995, now abandoned.

BACKGROUND OF THE INVENTION

1. Field of the Invention

The field of the invention is that of electronic cards which are coming into increasing use.

An electronic card may notably comprise a memory that can be used to store information and that can be interrogated remotely by means of microwave reception and transmission devices capable of being integrated into the card.

2. Description of the Prior Art

Thus a system, comprising an electronic label, for the identification and automatic detection of vehicles has been the object of a French patent application filed under No. 2 691 813. This system enables the interrogation of an electronic label comprising information elements (for example the VIN or Vehicle Identification Number, the number plate of a vehicle, etc.) that can be directly compared with data elements stored in a file (for example VIN numbers and number plate references of stolen vehicles).

In order to ensure the normal operation of such a label and more generally of electronic cards, it may be useful to fit out these cards with indicators of normal operation attesting notably to the fact that the different components integrated into the label are properly connected.

The owner of a vehicle who affixes such a label to the inside of his windshield will be able to make his own visual checks on the normal operation of all the electronic circuitry and ascertain that, in this way, the vehicle would actually be detected in the event of theft.

When used in a system for the automatic detection of stolen vehicles, the device can inform the legitimate owner that his non-functioning label has to be changed and can provide policemen with visual information on the fact that the vehicle needs to be checked, either because the vehicle does not have a label or because the label is malfunctioning.

Along with this system using electronic labels, there are many electronic systems having light indicators that enable visual checks on normal operation.

However, presently used devices have several drawbacks that need to be emphasized:

- the light indicators consume power and are difficult to use on portable systems;
- the light indicators are individual components that have to be connected to the system, and their space requirement is such that they cannot be incorporated into very fine systems of the microprocessor-based credit card type.

SUMMARY OF THE INVENTION

In this context, the invention proposes a new type of electronic card fitted out with an original indicator of normal operation.

More specifically, this is an electronic card with an electronic control circuit, comprising an electrooptical element, used as a normal operation indicator and a supply source, the electrooptical element and supply source being connected to the electronic control circuit.

The electronic circuit according to the invention may advantageously include communications means and, especially, microwave communications means enabling the storage of data elements and application programs of all types.

The supply of the unit may advantageously be provided by solar power units, supplemented by a cell or a battery but entailing lower electrical consumption as compared with the indicator that works only with cells.

The electrooptical element may advantageously use a polymer dispersed liquid crystal capable, under the effect of an electrical field, of changing from a scattering state to a transparent state.

The electronic card according to the invention may also include attachment means so that it can be affixed to a transparent surface, notably a windshield of a vehicle.

This card may also advantageously include embrittling means that cause the destruction of its physical and software elements during any operation to detach it, so as to prevent any falsification consisting, for example, of the use of an inappropriate vehicle card.

BRIEF DESCRIPTION OF THE DRAWINGS

The invention will be understood more clearly and other advantages shall appear from the following description and from the appended figures, of which:

FIG. 2 exemplifies an electronic card according to the invention;

MORE DETAILED DESCRIPTION

The electronic card according to the invention may be constituted by an epoxy type plastic carrier such as those used in cards of the credit card type.

Figure 1:
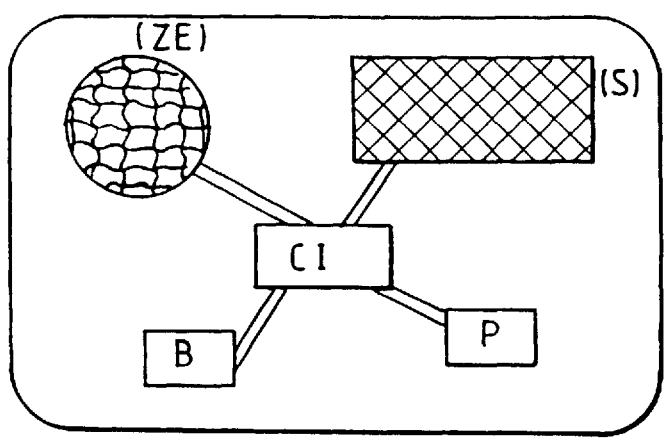
FIG. 1 gives a schematic view of an electronic card according to the invention with its different components.

The different components are integrated into this carrier. In this respect, FIG. 1 gives a schematic view of a card according to the invention. An electrooptical zone or element (ZE) is connected electrically to an electronic circuit (CI) supplied firstly by solar power units (S), secondly by a cell (P), a battery (B) being also connected to said circuit (CI).

The electrooptical zone (ZE) may advantageously be a patch of polymer-dispersed liquid crystal (PDLC) film. This film is inserted between two control electrodes. In general, PDLCs may form thin films with a thickness typically of about 10 microns. When there is no voltage, the films are in a scattering state because the orientation of the liquid crystal zones is random. Under an electrical field (about 10 volts) applied by means of ITO (indium and tin oxide) type transparent electrodes, all the liquid crystal zones get oriented and the material becomes transparent in the direction of the field vector. This is an electro-scattering effect. The details of their preparation and mode of operation are given in the article by J. W. Doane, "Liquid crystal applications and uses", in B. Bahadur ed., World Scientific, pp. 361–395.

At the position at which the cell (PDLC) is located, the carrier may be reflective or may be pierced in order to be transparent. In the case of a reflective zone, this zone may be defined in many ways: the definition may be set up by a metallization so as to obtain a mirror effect. It may also be obtained by the attaching of a hologram which will be invisible when the PDLC is in its scattering state. It may also be obtained by the attaching of a film of reflective material that reflects the light beams in their incident directions when the PDLC is in its transparent state.

The fact that the electronic card is working properly is observed visually under a light by means of the PDLC indicator. For example:

if this indicator is alternately opaque and then transparent in a rhythmic way, so as to allow the zone located beneath the PDLC to reflect light, then the circuit is operational, if the circuit is permanently opaque by day, then the circuit is out of operation.

More specifically, the electronic card according to the invention may comprise an integrated circuit having, in a known way, a programmable read-only memory coupled with a transmission/reception device connected to an antenna. The supply of this circuit is provided by a set of solar power units (silicon elements) complemented by a cell.

When the electronic card according to the invention is designed for use in a system for the identification of vehicles and the automatic detection of stolen vehicles for example, means for affixing said cards to the windshield may also be planned.

In this type of application, it is worthwhile to make maximum use of the surface area of the card, which is of the credit card type, to integrate the PDLC cell and the solar power units on the windshield side with the antenna, the other components being integrated on the rear face, said card being attached to the inside of the car on the windshield.

Figure 2A:
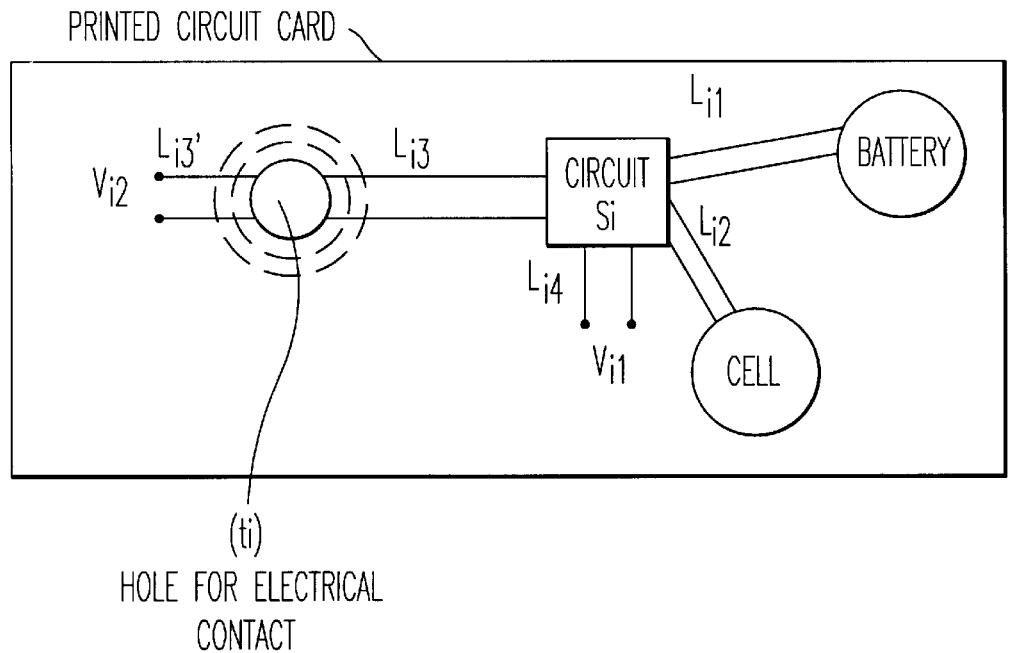
FIG. 2a shows a sectional view.

FIG. 2 in this respect shows an exemplary electronic card designed to be attached to a windshield type of transparent element. FIG. 2a gives a schematic view of the bottom side of the card with the elements, the electronic circuit made of silicon (CI), the battery (B), and the cell (P) being connected to the electronic circuit (CI) by conductive tracks $L_{i1}$ and $L_{i2}$.

Figure 2B:
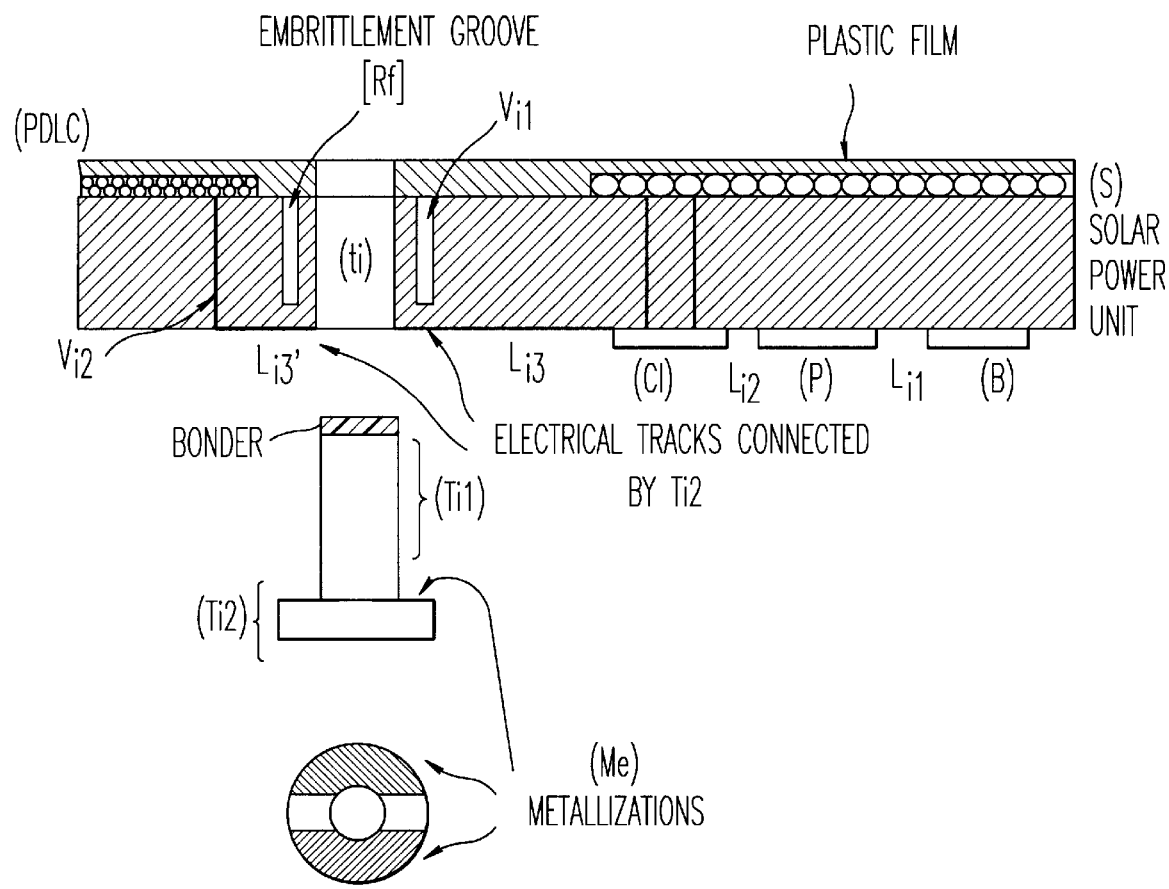
FIG. 2b shows a top view.

Conductive tracks $L_{i3}$ and $L_{i3}'$ connected to the circuit (CI) are also made on the surface to set up the electrical connection with the electro-optical (ZE) by means of conductive via holes $V_{i2}$. Conductive via holes $V_{i1}$ are used to electrically connect circuit (CI) with solar power unit (S) as shown in FIGS. 2a and 2b. These conductive tracks are interrupted and only one added conductive element may provide for their continuity. Indeed, to provide for the affixing of this card, cylindrical holes (ti) are designed along the thickness as shown in FIGS. 2a and 2b. In these holes, affixing elements formed by two sections ($T_{i1}$) and ($T_{i2}$) are introduced. ($T_{i1}$) has a diameter $d_1$ equal to that of the hole ($T_1$) and ($T_{i2}$) has a diameter $d_2$ that is greater than $d_1$.

These elements have a tip with bonder that will be applied to the windshield side and hence to the section ($T_{i1}$). The section ($T_{i2}$) for its part has peripheral metallizations (Me) so as to provide for electrical contact between the conductive tracks $L_{i3}$ and $L_{i3}'$ when the contact element is inserted into the perforation of the card, designed for this purpose. Thus, after the card is affixed to the required place (in particular the windshield), the normal operation indicator (represented by the PDLC element) is in a position to function.

In order to improve this type of electronic card, embrittlement grooves (Rf) may also be made along the thickness of the card. These grooves thus make it possible, when the card is detached, to destroy the conductive tracks that connect the different elements, thereby preventing the multiple use of one and the same card on different vehicles.

The use of such a card may thus advantageously be introduced into:

a system for the identification and automatic detection of stolen vehicles or objects comprising, in each identifiable vehicle or object, the electronic card fixed to a transparent element of the vehicle (the windshield) or of the identifiable object and, outside each vehicle or object, at least one mobile reader that can be shifted as desired in the vicinity of vehicles or identifiable objects comprising:

a memory for the recording of a file of codes for the identification of objects or vehicles to be identified;

microwave means for the simultaneous interrogation of the cards to prompt the transmission of all the codes for the identification of the vehicles or objects;

means for the comparison of the identification codes contained in the file with those transmitted by the cards;

and signalling means to immediately report the presence of vehicles whose identification codes correspond to those stored in the file;

any electronic card usable in the fields of banking and services (microprocessor-based cards, phone cards, etc.);

any portable electronic device or device on board a vehicle;

any badge enabling payment or "hands-free" access such as remote tollgate badges, access cards with contact-free reading, etc.

What is claimed is:

1. An electronic card comprising:

an electronic control circuit;

an electro-optical element connected to the electronic control circuit and configured as an operation indicator;

a power supply source connected to the electronic control circuit;

at least one affixing element adapted to attach the electronic card to an object;

electrical tracks connecting the electronic control circuit with the electro-optical element and the power supply source; and at least one embrittlement groove configured to destroy at least one of the electrical tracks, the electronic control circuit, the electro-optical element, the power supply source, and other physical elements, upon removal of the electronic card from the object to which the electronic card is adapted to be attached.

2. An electronic card according to claim 1, wherein the electro-optical element is placed before a transparent zone of the electronic card, to let through visible light.

3. An electronic card according to claim 1, wherein the electronic card comprises a catadioptric mirror reflecting zone on which the electro-optical element is placed.

4. An electronic card according to claim 1, comprising communications means connected to the electronic control circuit and configured to receive, memorize and store data elements.

5. An electronic card according to claim 4, wherein the communication means includes microwave reception and transmission means.

6. An electronic card according to claim 1, wherein the power supply source for the electronic control circuit comprises any one of solar power units, a power cell, and a battery.

7. An electronic card according to claim 1, wherein the electronic control circuit, electro-optical element, and power supply source are integrated into a plastic card.

8. An electronic card according to claim 1, wherein the object to which the electronic card is adapted to be attached comprises a substantially planer surface.

9. An electronic card according to claim 1, wherein the electronic card has holes into which there are incorporated the affixing elements having bonding tips.

10. An electronic card according claim 1, wherein the electro-optical element and the power supply source are integrated into one face of the electronic card, the electronic control circuit is integrated into another face of the electronic card; and the electrical tracks connect the electronic control circuit with the electro-optical element and the power supply source in a plane parallel to a plane of the electronic card and along an axis perpendicular to the plane of the electronic card.

11. An electronic card according to claim 1, wherein the affixing elements comprise first and second cylindrical elements, respectively having diameters d1, and d2, d1 being substantially equal to a diameter of the holes, d2 being greater than d1, the first element having a bonding tip located in a plane parallel to the electro-optical element and the power supply source and a length equal to a thickness of the electronic card, the second element having peripheral metallizations enabling an electrical connection between the electrical tracks connecting the electronic control circuit with the electro-optical element and the power supply source of the electronic card.

12. A system for the identification and automatic detection of vehicles or objects, comprising:

in each vehicle or identifiable object, an electronic card according to any one of claims 1, 4, 6 or 7 affixed to the vehicle or the identifiable object; and at least one mobile reader, comprising, a memory for recording a file of identification codes for the objects or vehicles to be identified;

microwave means for the simultaneous interrogation of the electronic card to prompt a transmission of all the identification codes of the vehicles or objects;

means for the comparison of the identification codes contained in the file of identification codes with those transmitted by the electronic card; and signalling means to report a presence of vehicles or objects whose identification codes correspond to those stored in the file of identification codes.

13. The system according to claim 12, wherein the electronic card is affixed to a transparent element of the vehicle or of the identifiable object.

14. The system according to claim 1, wherein the electro-optical element is a cell comprising polymer dispersed liquid crystal.

* * * * *